June 2, 1936.   H. LINDNER   2,042,720
JIG BORING MACHINE
Filed Feb. 11, 1935   3 Sheets-Sheet 1

June 2, 1936.    H. LINDNER    2,042,720
JIG BORING MACHINE
Filed Feb. 11, 1935    3 Sheets-Sheet 2

Inventor:
Herbert Lindner
By E. G. Mason
Attorney

June 2, 1936.     H. LINDNER     2,042,720
JIG BORING MACHINE
Filed Feb. 11, 1935     3 Sheets-Sheet 3
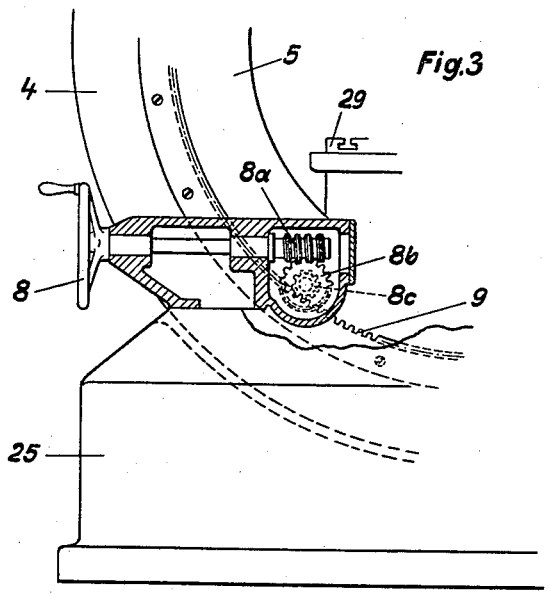
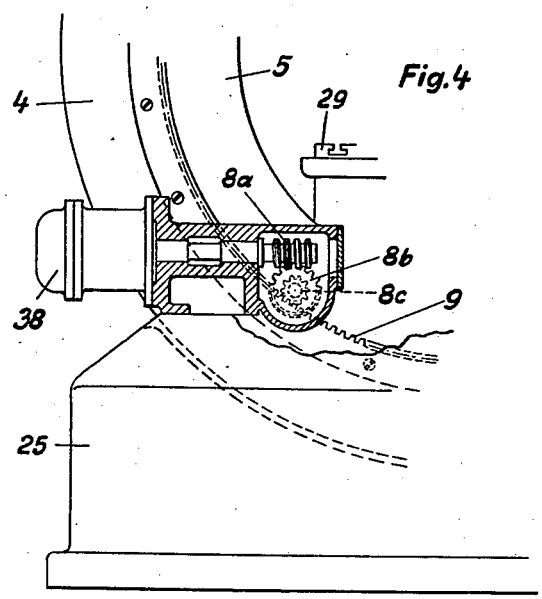
Inventor:
Herbert Lindner
By: E. G. Mason
Attorney Patented June 2, 1936

2,042,720

UNITED STATES PATENT OFFICE 2,042,720

JIG BORING MACHINE

Herbert Lindner, Berlin, Germany

Application February 11, 1935, Serial No. 6,110
In Germany February 26, 1934

3 Claims. (Cl. 77—4)

This invention relates to an improvement of the machine tool, more particularly jig boring machine, according to my Patent No. 1,991,285, issued Feb. 12, 1935. In the said machine tool, the transverse carriage, on which the cross-slide for the tool spindle carrier is adjustable, is slightly guided directly on the arcuate guides of the housing. The adjustment of the transverse carriage with the tool spindle carrier into different angular positions on the arcuate housing is carried out by means of a ring connected to the transverse carriage and having helical teeth engaged by a worm. This has been found to be disadvantageous since, in this form of construction of the machine, it is impossible to secure a perfect balancing of the weight. Due to the weight of the carriage with the tool spindle carriers in the angular positions between the vertical and horizontal planes acting in a one-sided manner, the adjustment of the tool on the arcuate housing is therefore only possible with a considerable expenditure of force. This expenditure can, it is true, be diminished by a suitable selection of the transmission ratio of the gear elements, but then it is necessary to be satisfied with a comparatively long time for effecting the adjustment. In addition, deformation of the adjusting ring and sometimes even of the housing readily occurs, and thereby the high requirements of accuracy which are demanded of such a machine tool are not fulfilled absolutely.

According to this invention, the transverse carriage for the cross-slide of the tool spindle carrier is now secured to a closed guide member, which is adjustable on the housing guides, which are likewise closed.

The closed guide member is advantageously constructed in the form of an anti-friction bearing and is movable with respect to the machine housing on at least one row of anti-friction rollers. In the guide body a balancing weight is accommodated opposite the transverse carriage with tool spindle carrier, so that, in each position of adjustment of the tool on the circular housing, a condition of equilibrium prevails and the same number of anti-friction rollers carry load.

A principal advantage of this construction of the machine according to the invention resides in the extraordinarily great rigidity of the circular housing, this rigidity being provided by the closed form of construction. By means of the closed guide member, the transverse carriage is provided with the most satisfactory guiding which is at all possible. The construction of the guide member in the form of an anti-friction bearing ensures an extraordinarily easy and rapid adjustability on the circular housing guides. Whereas in the case of the previous form of construction, it has not been possible to obtain a perfect balancing of weight in the different positions of adjustment of the tool spindle carrier on the machine housing, it is now possible in a simple manner to accommodate an adequate counter-weight in the guide member for the transverse carriage, the said guide member being provided with cavities, so that in each tool position on the circular housing there is a balancing of weight and no detrimental deformation of the said housing occurs.

A form of construction of the machine is shown by way of example in the accompanying drawings, in which:

Figure 3 is a detail of the devices for adjusting the guide member and Figure 4 is a modified embodiment of the detail shown in Fig. 3.

Figure 1:
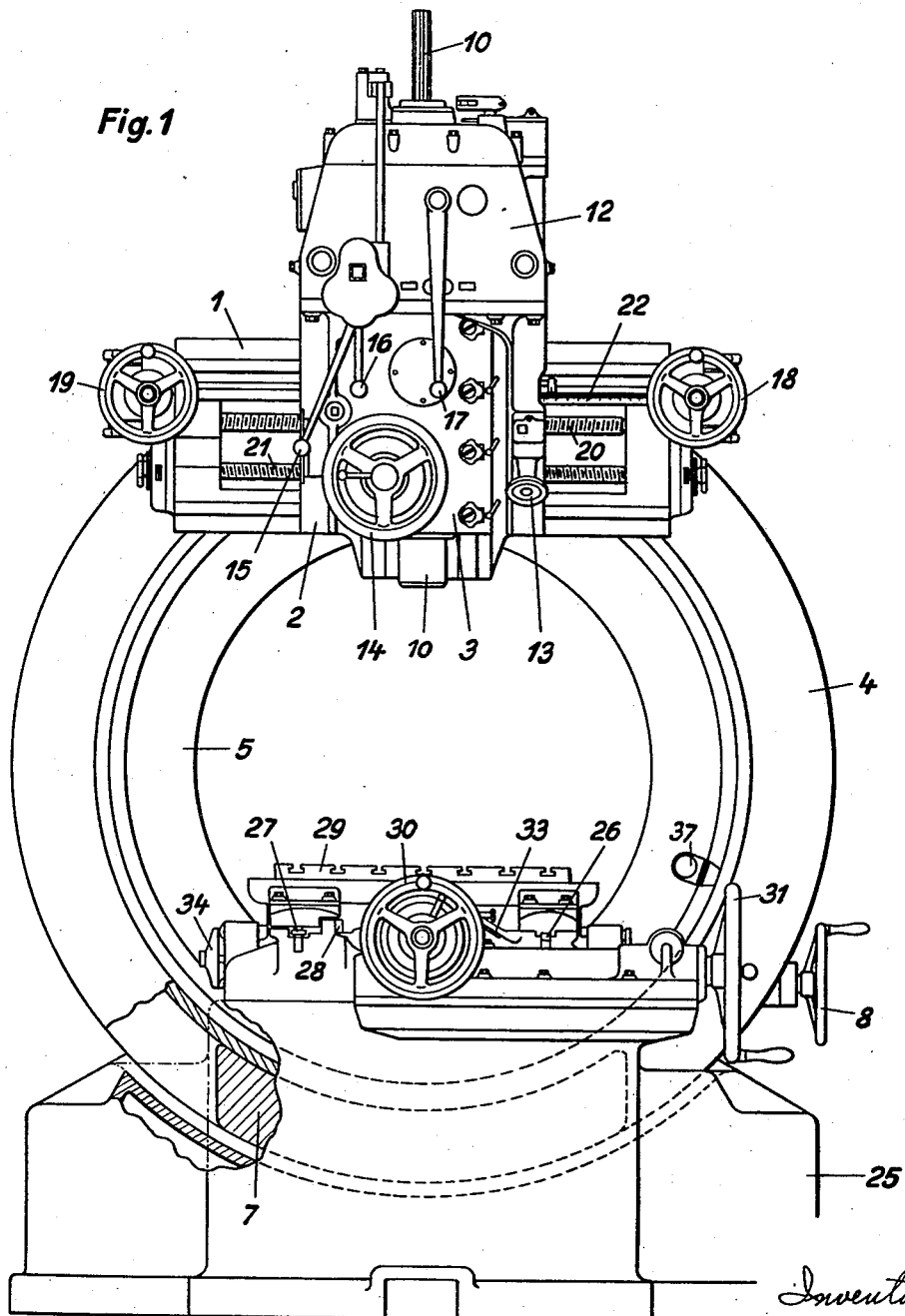
Figure 1 is a front elevation.
Figure 2:
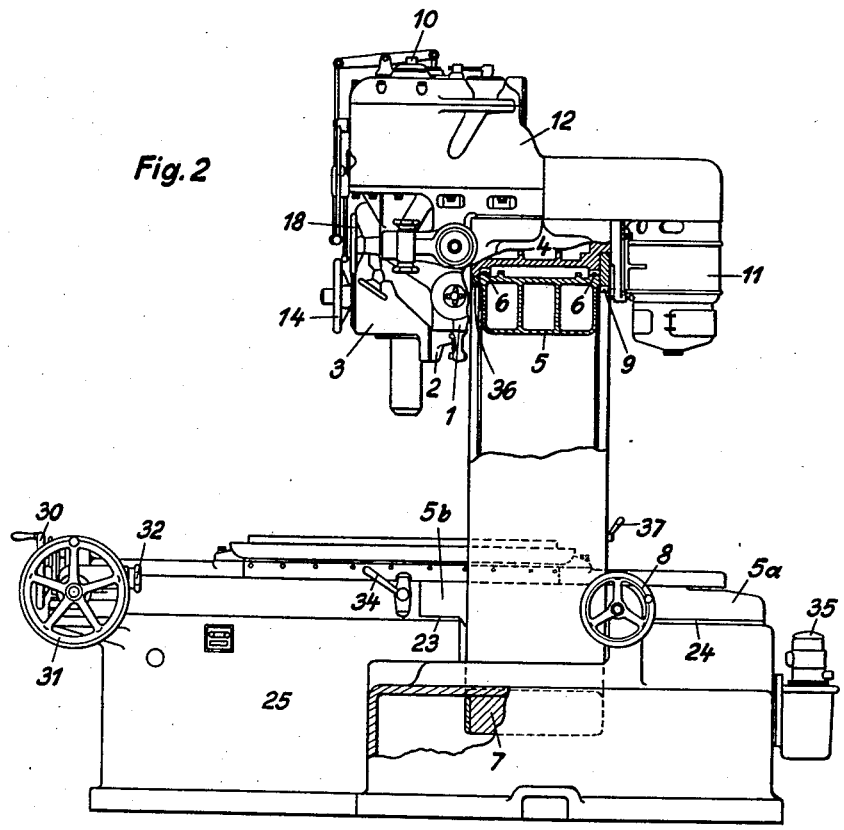
Figure 2 is an end elevation with part section through the circular housing and the guide member for the transverse carriage.

The transverse carriage 1 for the tool spindle carrier 3 secured to the cross-slide 2, is secured to a closed annular guide member 4. The latter has circular guide faces, by means of which it is guided on the outer periphery of the circular housing 5 which is likewise closed. In order to provide easy adjustability, the guide member 4 does not rest directly on the counter-guides of the circular housing, but upon two rows of anti-friction rollers 6. The guide member 4 and the housing 5 thus constitute a very large anti-friction bearing. The adjustment of the guide member 4 with the transverse carriage 1 and tool spindle carrier 3 may be carried out by means of the handwheel 8. The latter actuates a self-braking worm 8a, which is connected with a worm wheel 8b, the pinion 8c of which engages the toothed crown 9 secured to the guide member 4. In some cases for the handwheel the electromotor 38 can be substituted. The guide member 4 is clamped in a predetermined position on the housing 5 by means of an expanding ring 36 provided with an inclined surface, the expanding of the said ring being effected by means of a toggle system 37. Accommodated in the cavities of the guide member 4, opposite the transverse carriage with the tool spindle carrier is a counter-balancing weight 7, for example of lead or the like. The counter-balancing weight corresponds to the weight of the transverse carriage with the tool spindle carrier and the driving members pertaining thereto. A condition of equilibrium is thereby secured in every position of adjustment of the tool on the circular housing, so that there is always a uniform distribution of weight on the anti-friction rollers, and always the same number of anti-friction rollers carry load. The adjustment on the housing can be carried out with extreme ease and rapidity.

The drill spindle 10 is driven from an electric motor 11 which drives it through the medium of a change-speed gear accommodated in the gear box 12, so that different rates of rotary speed of the drill spindle can be secured. The feed of the drill spindle is effected smoothly from a friction gear likewise accommodated in the gear box 12. The rates of feed are adjusted by means of the handwheel 13. Hand feeding of the drill spindle is effected by means of the handwheel 14, which in known manner is disengageably inter-connected to the automatic feed device. The various rates of rotary speed of the drill spindle are adjustable by means of control levers 15 and 16 which act on the change-speed gear. The starting and stopping of the drill spindle movements are effected by means of a hand lever 17. The transverse adjustment of the slide 2 with the tool spindle carrier 3 on the traverse carriage 1 may be effected from either side of the machine by means of the hand-wheels 18 and 19. The adjustment is effected by means of a trailing spindle gear comprising mainly the transport spindle 20 and the measuring spindle 21. The adjustment load always bears on the transport spindle 20 so that the measuring spindle 21 is protected from wear and always possesses a high degree of accuracy. The degree of transverse adjustment of the tool can be read off on a longitudinal scale 22.

The circular housing 5 has projections 5a and 5b by which it is located on and secured to the parts 23 and 24 of the machine bed 25. The guides 26, 27, 28 for the work holder or table 29 are situated half on the machine bed 25 and the other half on the parts 5a and 5b of the circular housing 5. The guides 26, 27 are roller surface guides, while the guide 28 is a straight guide with sliding friction. The coarse adjustment of the table may be effected by means of a screw-threaded spindle (not shown in the drawings) from a hand-wheel 30 mounted at the end of the bed, or from a hand-wheel 31, at the side. The fine adjustment is effected by means of a small handwheel 32. The adjusted position of the table is read off on a scale 33 provided on the machine bed 25. To relieve the table adjusting spindle of load during the operation of the machine, a clamping device 34 is provided. Similarly, the cross-slide 2 is adapted to be clamped in each adjusting position on the transverse carriage 1. The cooling liquid is pumped to the working place by means of a cooling water pump 35.

It is obvious that the guide member 4 may also be guided on the inner periphery of the circular housing 5. This construction requires only slight structural modification over the form of construction of the machine as shown in the drawings.

I claim:—

1. A machine tool having a fixed bed, a work holder on said bed, an annular support on the bed and extending over and completely encircling the work holder and having a surface of revolution, an annular member guided by said surface of revolution for angular adjustment in a vertical plane about the work holder, and tool means carried by said annular member in its movement of adjustment and including a rotary tool extending inwardly toward the work, and also including guide and adjustment means for selectively presenting the tool with respect to the annular member while maintaining the tool axis constantly parallel to a selected diameter of the annular member, said diameter being selected by the aforesaid angular adjustment.

2. A machine tool having a fixed bed, a work table movable along said bed, a support fixed on said bed and having a cylindrical surface extending over and completely around the work table, a closed annular member surrounding the work table and guided in a vertical plane by said cylindrical surface for adjustment angularly with respect to the work table, tool means including a drill spindle and guide means for movement of the spindle at right angles to the direction of movement of the work table, and a counterweight on said annular member for counterbalancing the tool means.

3. A machine tool having a fixed bed, a work holder movable horizontally along said bed, a support fixed to said bed and extending over and completely encircling the work holder with its periphery having a surface of revolution, an annular member guided upon said surface so that said annular member may be adjusted about said support and work holder and tool means carried by said annular member and moving with the same in a vertical plane during the adjustment thereof whereby the tool is presented at varying angles to the work holder.

HERBERT LINDNER.